United States Patent [19]

Marracino et al.

[11] Patent Number: 5,982,066
[45] Date of Patent: Nov. 9, 1999

[54] ELECTRIC MOTOR

[75] Inventors: Charles Robert Marracino; William A. Miller, both of Torrington; John W. Hoover, Huntington, all of Conn.

[73] Assignee: Nidec America Corporation, Torrington, Conn.

[21] Appl. No.: 08/835,946

[22] Filed: Apr. 11, 1997

[51] Int. Cl.[6] .............................. H02K 5/00; H02K 5/12; F16C 43/00

[52] U.S. Cl. ........................... 310/91; 310/67 R; 310/90; 384/202; 384/204; 384/215

[58] Field of Search .................................. 310/67 R, 90, 310/51, 91, 62, 63, 66; 384/202, 204, 215, 214, 903; 360/98.07, 99.04, 99.08

[56] References Cited

U.S. PATENT DOCUMENTS

| | | | |
|---|---|---|---|
| 3,914,071 | 10/1975 | Friese | 417/353 |
| 4,101,945 | 7/1978 | Butsch | 360/102 |
| 4,249,896 | 2/1981 | Kerfoot, Jr. | 433/132 |
| 4,823,034 | 4/1989 | Wrobel | 310/67 |
| 5,059,844 | 10/1991 | Anstine | 310/90 |
| 5,505,548 | 4/1996 | Stewart | 384/537 |
| 5,555,211 | 9/1996 | Bernett | 360/99.08 |
| 5,562,347 | 10/1996 | Hsieh | 384/215 |
| 5,663,604 | 9/1997 | Takahashi | 310/91 |

*Primary Examiner*—Nestor Ramirez
*Assistant Examiner*—Tran N. Nguyen
*Attorney, Agent, or Firm*—Cummings & Lockwood

[57] ABSTRACT

The invention provides a motor and a bearing support and motor housing assembly, wherein the bearing support is detachably mounted to the housing with a flexible fastener, such as a snap ring. A resilient member, such as a spring washer, is seated between the fastener and either the housing or the bearing support to apply a biasing force against the fastener.

20 Claims, 3 Drawing Sheets

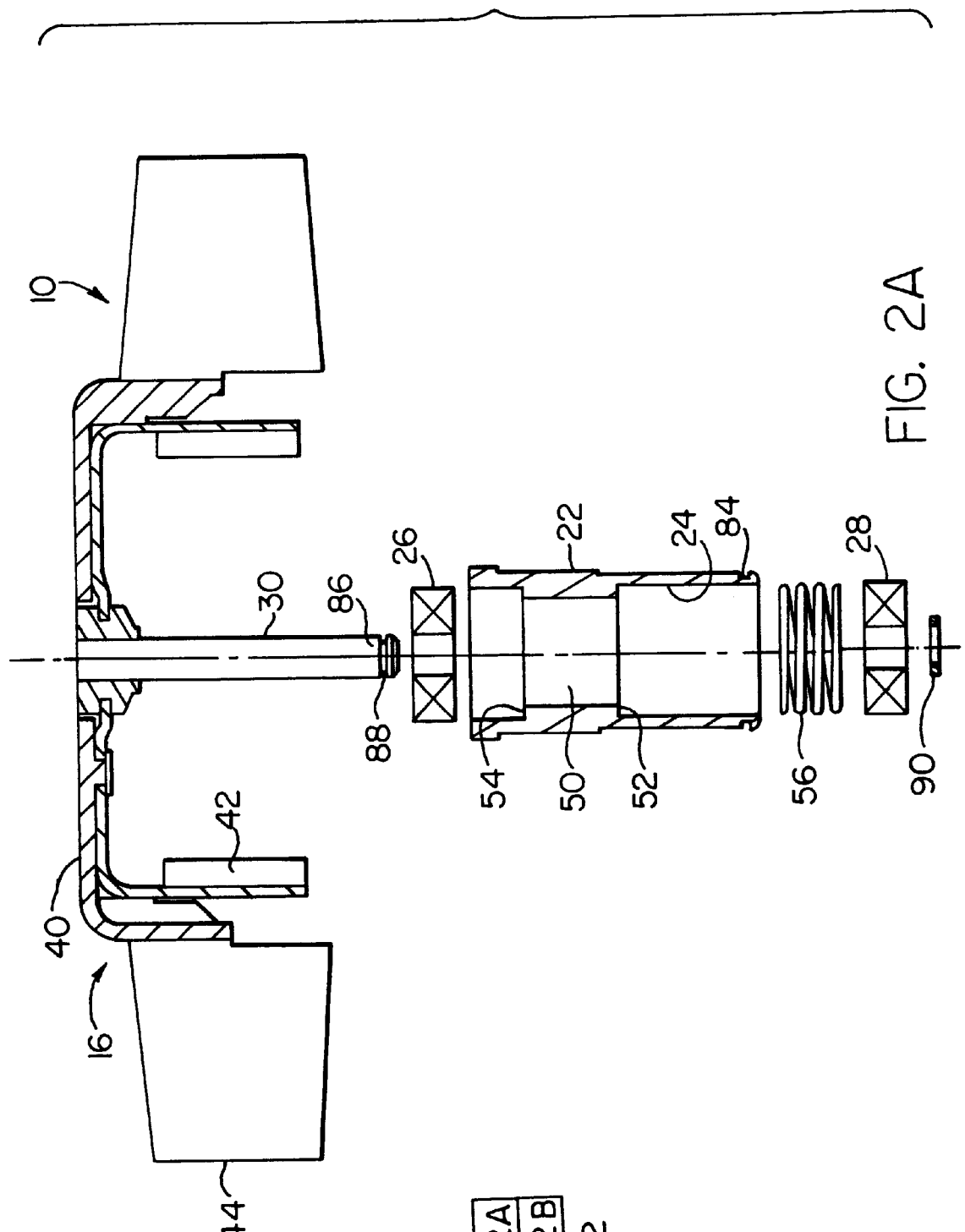

ELECTRIC MOTOR

The present invention relates generally to the field of electric motors and, more particularly, to the field of small brushless DC motors. Such motors are used, for example, in fan and blower applications where low cost, high efficiency and long term reliability are critical.

To prolong the useful life of small brushless DC motors it is often necessary to disassemble the motor to repair or replaced damaged components. In this regard, replacement of the motor shaft bearings is of particular concern, since this is the component of the motor which is most likely to fail or become worn after prolonged use. It is also not unusual to find that modifications are required after the motor is built, either because the initial specifications for the motor were not correct or because the motor must be modified to meet altered specifications.

Typically, motors are assembled with the bearing support or tower adhesively mounted in the motor housing. It is very difficult to separate these parts and disassemble the motor for the purposes of repair, replacement or re-work. Usually, a number of housings and bearing towers are damaged as the motors are disassembled.

Motors are known in the art which include a bearing tower that is detachable from the motor housing. However, in such motors the bearing tower is attached to the motor housing either by the use of screws, or by threading one end of the tower and using a nut to couple the tower to the housing. Screwing the tower to the motor housing is not desirable because the screws can work lose while the motor is operating resulting in severe damage to the motor. Further, the screws can be lost when the bearing support is removed from the housing and the motor is disassembled. Designs using a bearing support threaded at one end require that the opposite end of the support be provided with a retaining flange that mates with a shoulder machined into the motor housing. Such designs not only require expensive machining operations to provide the threads, flange and shoulder, but, as in the case of the screws discussed above, the nut used to coupled the bearing support to the housing can work lose during operation of the motor or be lost during disassembly of the motor.

Accordingly, it is an object of the invention to provide an improved motor wherein the bearing support is detachably mounted to the housing without the use of screws or a threaded bearing support.

SUMMARY OF THE INVENTION

The invention meets the above-stated objects by providing, in one aspect, a motor housing and bearing support assembly including a motor housing, a bearing support for supporting at least one motor shaft bearing, and a flexible fastener mounted on either the bearing support or the housing for releasably coupling the bearing support to the housing. The assembly further includes a resilient member seated between the fastener and the other of the housing and the bearing support to provide a biasing force against the fastener.

In the preferred embodiment of the assembly, the bearing support defines an annular groove, and the flexible fastener comprises a flexible ring mounted in the groove. The resilient member comprises a spring or wave washer seated between the flexible ring and the motor housing.

In a second aspect, the invention provides a motor including a housing, a bearing support for supporting as least one shaft bearing, a shaft rotatably supported by the bearing, and a stator assembly mounted at least partially within the housing. A rotor is coupled to the shaft for rotation therewith, and a flexible fastener is mounted either on the bearing support or the housing for releasably coupling the bearing support and the housing. A resilient member is seated between the fastener and the other of the housing and the bearing support and provides a biasing force against the fastener.

In the preferred embodiment, the bearing support comprises a bearing tower having a central bore, and the motor housing includes a hub having an axial bore. The stator is at least partially supported on the hub, and the bearing tower is at least partially disposed within the axial bore of the hub. Either the stator or the hub defines a key and the other and the defines a corresponding keyway which cooperate to locate the stator with respect to the housing.

In yet another aspect, the invention provides a bearing support assembly for a motor including a housing and a rotatable shaft. The assembly includes a bearing support, at least one shaft bearing mounted on the support for rotatably supporting the motor shaft, and a flexible fastener for releasably coupling the bearing support to the housing. A resilient member is seated between the fastener and either the housing or the bearing support when the bearing support and the housing are coupled together.

BRIEF DESCRIPTION OF THE DRAWINGS

FIGS. 2A and 2B are sectional views of the motor shown in FIG. 1.

DETAILED DESCRIPTION OF THE INVENTION

Figure 1:
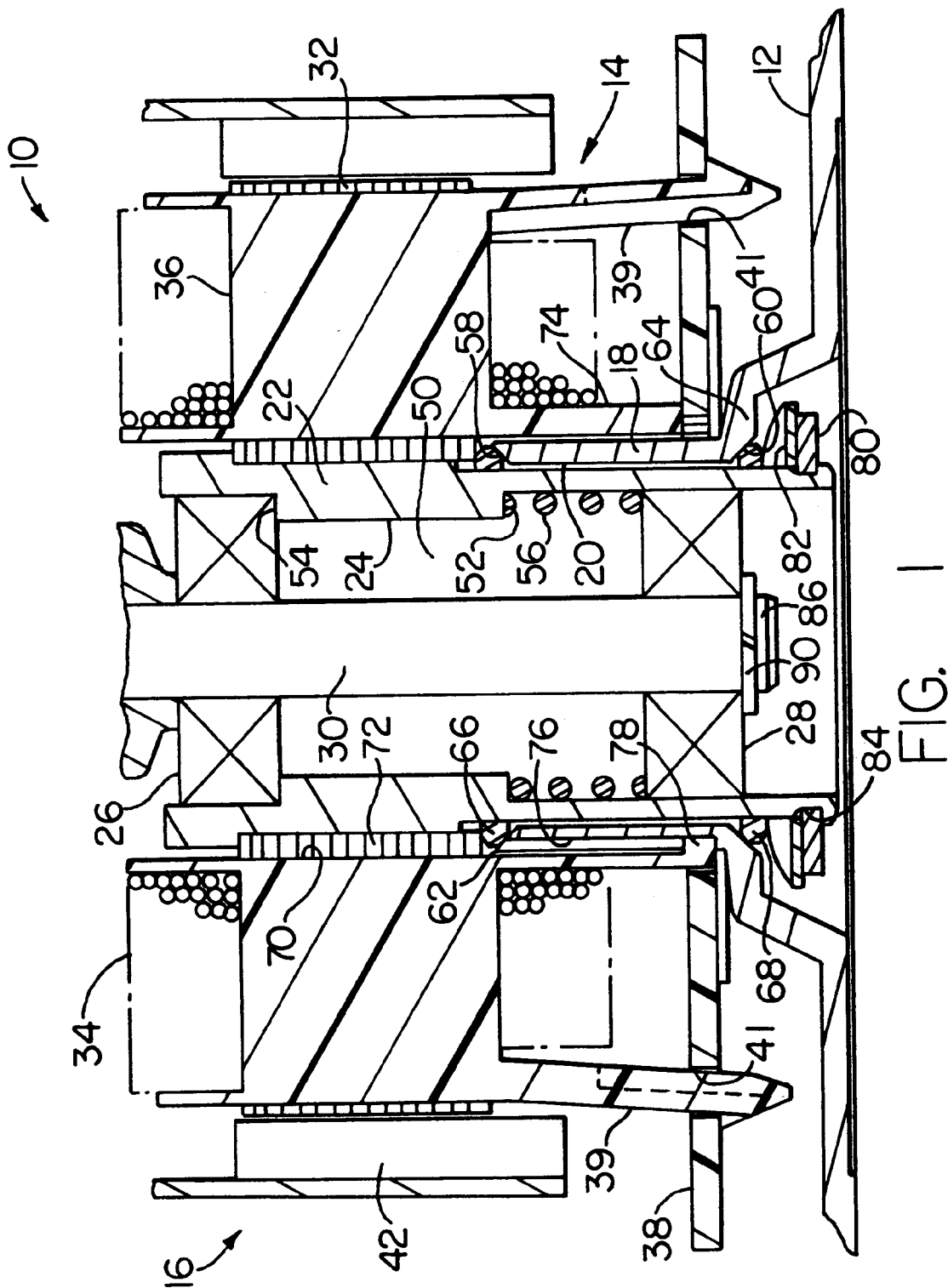
FIG. 1 is a sectional view of a motor embodying various aspects of the invention.
Figure 2B:
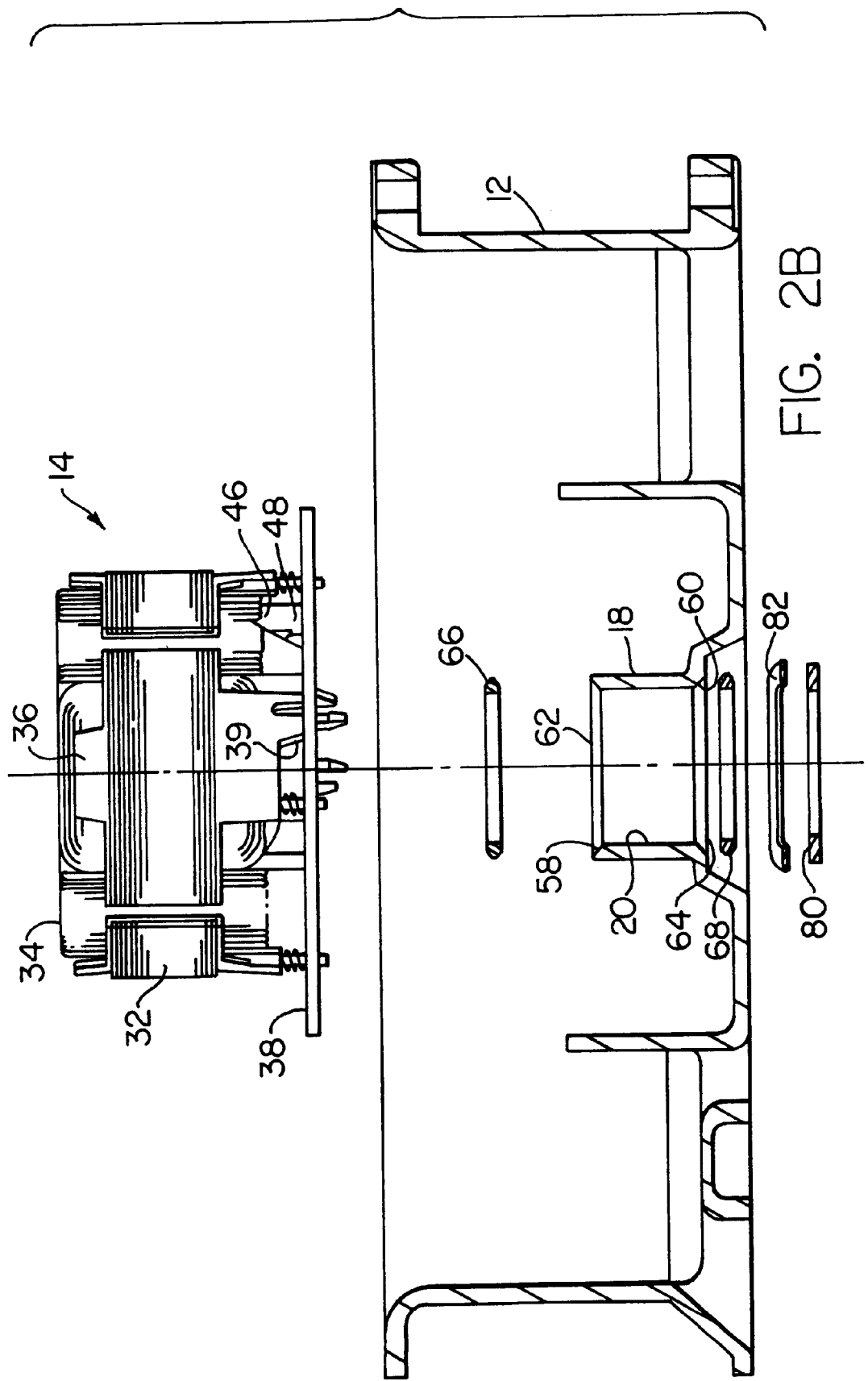

FIGS. 1 and 2 illustrate a brushless DC fan embodying various aspects of the invention. The fan, generally designated 10, includes a housing 12, a stator assembly, generally designated 14, and a rotor assembly, generally designated 16. The housing 12 has a hub 18 defining an axial bore 20. The hub supports the stator assembly 14 as will be explained further below. A bearing support, which in the illustrated embodiment comprises bearing tower 22, is mounted within the axial bore 20 of the hub and extends through the stator assembly 14. The bearing tower define a central bore 24, and two shaft bearings 26 and 28 are mounted within the central bore for rotatably supporting motor shaft 30 which is fixedly mounted to the rotor assembly 16.

Referring now to the stator and rotor assemblies in more detail, the stator assembly 14 includes stator laminations 32 which support a plurality of windings 34, and a plastic insulator 36 which insulates the windings from the laminations. A laminated PC board 38 carrying the motor energization and control circuits is releasably attached to the insulator by resilient mounting members 39, 39 received in apertures 41, 41 defined by the board. The rotor assembly 16 includes, as noted above, the motor shaft 30 which is fixedly mounted to a rotor cup 40. An annular permanent magnet 42 is adhesively attached to the interior of the rotor cup, and an impeller 44 is mounted to the outside of the cup.

As will be appreciated by those skilled in the art, when the stator windings are energized the stator generates a number of electromagnetic poles. The electromagnetic stator poles interact with the permanent magnet poles of the rotor to generate torque which causes the rotor assembly to rotate. The motor is commutated by a Hall cell 46 mounted on the PC board 38 by a support or holder 48.

As shown in FIG. 2, the central bore 24 of the bearing tower 22 is stepped and includes a portion 50 of reduced diameter defined by lower shoulder 52 and upper shoulder 54. Shaft bearing 26 is seated in the central bore against upper shoulder 54. A spring 56 is seated in the central bore of the tower against lower shoulder 52. The spring 56 and shaft bearing 26 are axially displaced from one another within the central bore by the portion of reduced diameter 50.

The other shaft bearing 28 is resiliently mounted in the central bore 24 by the spring 56. Thus the spring serves as a means of axially displacing the two shaft bearings to more evenly distribute the load of the rotating shaft between the bearings. In addition, as the motor shaft 30 is rotated, the spring 56 permits limited axially movement of the bearing 28, which tends to reduce noise and vibration from the motor and prolong the life of the bearings by preloading the balls to the races inside the ball bearing.

As shown in FIG. 2, the hub 18 defines two beveled shoulders 58 and 60 at, respectively, upper and lower ends 62 and 64 of the axial bore 20. A beveled plastic ring 66 is seated on and mates with shoulder 58, and a corresponding ring 68 is seated on and mates with shoulder 60. The rings act as bushings to center the bearing tower 22 within the axial bore of the hub. Thus, the rings 66 and 68 eliminate the very close tolerance typically required in prior art motors for the fit between the bearing tower and the hub of the motor housing.

Referring now to FIGS. 1 and 2, the insulator 36 defines a central passageway 70. A section 72 of the stator laminations 32 are disposed in the central passageway, and the internal diameter of the laminations comprising section 72 equals the internal diameter of the axial bore 20 defined by the hub. The insulator 36 also defines an axially extending flange 74 dimensioned to surround and engage the hub 18 to mount the assembly to the housing. The stator assembly 14 mounts down onto the hub until the section 72 of laminations disposed in the passageway abuts the beveled ring 66 seated on the beveled shoulder 58. To insure that the motor housing and stator assembly are in proper registration, the hub defines a key way 76, and the flange 74 defines an radially inwardly extending key 78 which mates with the key way 76 as the stator assembly is pressed onto the hub.

As shown best in FIG. 1, the bearing tower is disposed in both the central passageway 70 defined by the insulator 36 and the axial bore of the hub and extends beyond the beveled shoulder 60 of the housing. The bearing tower 22 is releasably and resiliently coupled to the motor housing using snap ring 80 and spring or wave washer 82. The snap ring 80 is retained in an annular groove 84 defined by the portion of the bearing tower extending beyond the housing 12 to couple the tower to the housing. The spring washer 82 is positioned between the snap ring 80 and the ring 68 seated on shoulder 60 and exerts a biasing force against the snap ring to provide a small degree of resiliency to the coupling of the housing and the bearing tower. This resiliency in the coupling of the bearing tower and motor housing reduces noise and vibration in the motor as the shaft 30 rotates and prolongs the useful life of the shaft bearings 26 and 28.

Of course, the snap ring and spring washer can be provided as a single element and inserted on the tower in a single operation to resiliently couple the tower and housing together. The invention is also not limited to a snap ring fastener and a spring washer, but other well-known equivalents such as a spring clamp and a spring could be utilized.

As shown in FIG. 2, the lower end 86 of the motor shaft 30 defines an annular groove 88, as shown in FIG. 2, and the groove 88 is approximately adjacent the lower beveled shoulder 60, as shown best in FIG. 1. However, since shaft bearing 28 is resiliently mounted in the central bore of the bearing tower by spring 56, the bearing 28 can be depressed into the central bore 24. Depressing the bearing into the central bore fully exposes the lower end 86 of the shaft thus providing access to the groove 88 which permits snap ring 90 to be snapped in place in the groove. Thus, snap ring 90 and groove 88 cooperate to couple the rotor assembly 16 to the housing 12 and to maintain the entire motor 10 in assembly.

The invention is in no way limited by the particular embodiment illustrated, and a number of modifications can be made to the design of the motor without departing from the scope of the invention. For example, the motor housing can be constructed with a stepped axial bore, with a beveled shoulder which defines the step from a larger diameter to a smaller diameter within the bore. The bearing tower is constructed with a flange adapted to engage the beveled shoulder, and the axial bore of the housing defines a groove for retaining the snap ring to couple the housing and the bearing tower together. In this embodiment, the snap ring is axially displaced a sufficient distance for the bearing tower flange to seat the spring washer or other suitable biasing member between the flange and the snap ring so as to resiliently couple the motor housing and bearing tower together. Alternatively, the bearing tower flange can be eliminated and replaced with a groove formed in the bearing tower and a second snap ring retained in the groove to seat against the beveled shoulder.

While preferred embodiments have been shown and described, various modifications and substitutions may be made without departing from the spirit and scope of the invention. Accordingly, it is to be understood that the present invention has been described by way of example and not by limitation.

We claim:

1. A motor housing and bearing support assembly comprising:
    a housing including a hub having an axial bore, the axial bore of the hub having an outer end and an inner end, and the hub defining a shoulder surrounding at least one of the ends of the bore;
    a bearing support for supporting at least one shaft bearing and including a bearing tower having a central bore, the bearing tower being at least partially disposed within the axial bore of the hub;
    a bushing supported on the shoulder for centering the bearing tower within the axial bore of the hub;
    a shaft rotatably supported by the bearing;
    a flexible fastener mounted on one of the bearing support and the housing for releasably coupling the bearing support and the housing; and
    a resilient member seated between the fastener and the other of the housing and the bearing support and providing a biasing force against the fastener.

2. The assembly of claim 1, wherein the flexible fastener comprises the resilient member.

3. The assembly of claim 1 further comprising at least one motor shaft bearing resiliently mounted in the central bore of the bearing tower.

4. The assembly of claim 1, wherein the bearing support defines an annular groove, and the flexible fastener comprises a flexible ring mounted in the groove.

5. The assembly of claim 4, wherein the resilient member comprises a spring washer seated between the flexible ring and the motor housing.

6. The assembly of claim 1, wherein the bushing is a resilient bushing, and wherein the resilient bushing and the resilient member dampen vibration between the housing and the bearing tower when the shaft rotates.

7. A motor comprising:
   a housing including a hub having an axial bore, the axial bore of the hub having an outer end and an inner end, and the hub defining a shoulder surrounding at least one of the ends of the bore;
   a bearing support supporting at least one shaft bearing and including a bearing tower having a central bore, the bearing tower being at least partially disposed within the axial bore of the hub;
   a bushing supported on the shoulder for centering the bearing tower within the axial bore of the hub;
   a shaft rotatably supported by the bearing;
   a stator assembly mounted at least partially within the housing;
   a rotor coupled to the shaft for rotation therewith;
   a flexible fastener mounted on one of the bearing support and the housing for releasably coupling the bearing support and the housing; and
   a resilient member seated between the fastener and the other of the housing and the bearing support and providing a biasing force against the fastener.

8. The motor of claim 7, wherein the flexible fastener comprises the resilient member.

9. The motor of claim 7, wherein the shoulder defined by the housing is a beveled shoulder, and the bushing comprises a beveled ring contoured to mate with the beveled shoulder when supported thereon.

10. The motor of claim 7 wherein the shaft bearing is resiliently mounted in the central bore of the bearing tower.

11. The motor of claim 10 further comprising a retainer mounted on one of the motor shaft and the bearing tower for retaining the bearing within the central bore of the bearing tower.

12. The motor of claim 7, wherein the bearing support defines an annular groove, and the flexible fastener comprises a flexible ring mounted in the groove.

13. The motor of claim 12, wherein the resilient member comprises a spring washer seated between the flexible ring and the motor housing.

14. The motor of claim 7, wherein the bushing is a resilient bushing, and wherein the resilient bushing and the resilient member dampen vibration between the housing and the bearing tower when the shaft rotates.

15. The motor of claim 7, wherein the stator is at least partially supported on the hub of the motor housing, one of the stator and the hub defining a key and the other of the stator and the hub defining a corresponding keyway, the key and the keyway cooperating to locate the stator on the hub.

16. A bearing support assembly for a motor including a housing and a rotatable shaft, said housing including a hub having an axial bore, the axial bore of the hub having an outer end and an inner end, and the hub defining a shoulder surrounding at least one of the ends of the bore, the assembly comprising:
    a bearing support supporting at least one shaft bearing and including a bearing tower having a central bore, the bearing tower adapted to be at least-partially disposed within the axial bore of the hub;
    a flexible fastener for releasably coupling the bearing support to the housing; and
    a resilient member seated between the fastener and one of the housing and the bearing support when the bearing support and the housing are coupled, the resilient member providing a biasing force against the fastener.

17. The assembly of claim 16 further comprising means for resiliently mounting the shaft bearing in the central bore of the bearing tube.

18. The assembly of claim 16, wherein the flexible fastener comprises a flexible ring.

19. The assembly of claim 16, wherein the resilient member comprises a flexible washer.

20. The assembly of claim 16, wherein the flexible fastener comprises the resilient member.

* * * * *